(12) United States Patent
Cray

(10) Patent No.: US 6,370,084 B1
(45) Date of Patent: Apr. 9, 2002

(54) ACOUSTIC VECTOR SENSOR

(75) Inventor: Benjamin A. Cray, West Kingston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/912,656

(22) Filed: Jul. 25, 2001

(51) Int. Cl.⁷ .................................................. H04R 1/02

(52) U.S. Cl. ........................ 367/141; 181/122; 367/176

(58) Field of Search ................................ 367/178, 188, 367/910, 141, 176; 181/122; 310/340, 344, 337; 73/649

(56) References Cited

U.S. PATENT DOCUMENTS

| | | | | |
|---|---|---|---|---|
| 3,680,392 A | * | 8/1972 | Hoffman et al. | 73/514.05 |
| 4,955,012 A | * | 9/1990 | Bledsoe et al. | 367/155 |
| 4,982,375 A | * | 1/1991 | Ng | 367/135 |
| 5,392,258 A | * | 2/1995 | Gabrialson et al. | 181/122 |
| 6,172,940 B1 | * | 1/2001 | McConnell et al. | 367/178 |

* cited by examiner

Primary Examiner—Ian J. Lobo
(74) Attorney, Agent, or Firm—Michael J. McGowan; Prithvi C. Lall; Michael F. Oglo

(57) ABSTRACT

An acoustic vector sensor for monitoring acoustic energy underwater includes an acoustic sensing tri-axial accelerometer, a body of syntactic foam encasing the accelerometer, a body of viscoelastic rubber encasing the body of syntactic foam, and a rigid plastics coating encasing the body of viscoelastic rubber.

7 Claims, 1 Drawing Sheet

ACOUSTIC VECTOR SENSOR

STATEMENT OF GOVERNMENT INTEREST

The invention described herein may be manufactured and used by and for the Government of the United States of America for Governmental purposes without the payment of any royalties thereon or therefor.

CROSS-REFERENCE TO RELATED PATENT APPLICATIONS

Not applicable.

BACKGROUND OF THE INVENTION (1) Field of the Invention

The invention relates to acoustic sensors for underwater monitoring and is directed more particularly to an acoustic vector sensor.

(2) Description of the Prior Art

It is known to use pressure-sensing hydrogphones in submarine sonar systems. However, it is desirable to improve the sensitivity of sonar systems, while at the same time reducing self noise generated by the platform on which the sensors are mounted. By improvement of sensitivity to target noise and reduction of sensitivity to self-noise, improvements in target bearing and elevation are realized with consequent improvements in target angle and speed estimations.

SUMMARY OF THE INVENTION

An object of the invention is, accordingly, to provide a vector sensor for detecting and monitoring underwater targets, which sensors are more sensitive to target acoustics than hydrophones and less sensitive to self-noise.

With the above and other objects in view, as will hereinafter appear, a feature of the present invention is the provision of an acoustic vector sensor for monitoring acoustic energy underwater, the sensor comprising an acoustics sensing tri-axial accelerometer, a body of syntactic foam encasing the accelerometer, a body of viscoelastic rubber encasing the body of syntactic foam, and a rigid plastics coating encasing the body of viscoelastic rubber.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the drawing and wherein.

DESCRIPTION OF THE PREFERRED EMBODIMENT

Figure 1:
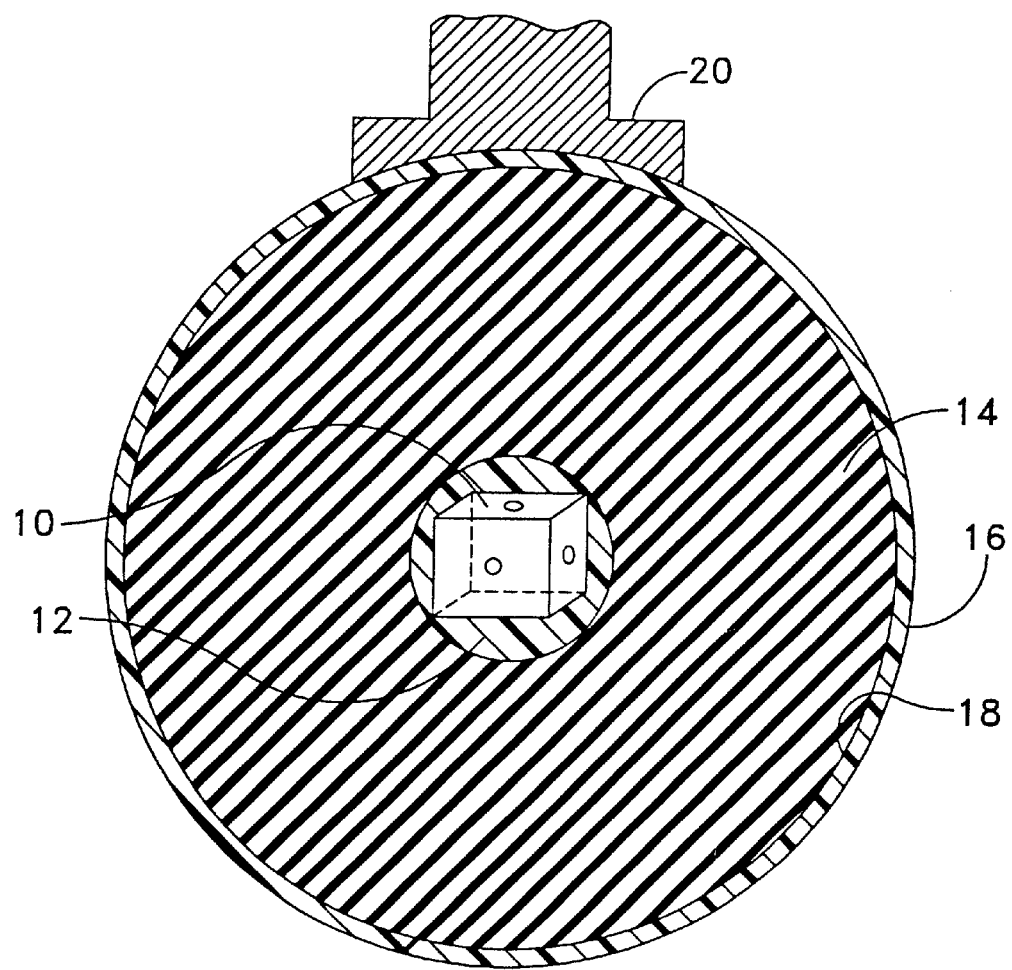
FIG. 1 is a substantially sectional view of one form of sensor illustrative of an embodiment of the invention.

Referring to FIG. 1, it will be seen that an illustrative acoustic vector sensor includes a tri-axial accelerometer 10. Such devices are known and are available commercially. A suitable device has been found in PCB Piezotronics Model No. A356A08, which is of a cube configuration, of a size of about 0.8 in×0.8 in×0.8 in, and a weight of about 0.63 oz.

As shown in FIG. 1, the accelerometer 10 is encased in a sphere 12 of syntactic foam. The sphere 12 is of a density and a volume to provide neutral buoyancy to the sensor.

The sphere 12 of syntactic foam is surrounded by a spherical body 14 which, in turn, is contained in a rigid protective shield 16. The body 14 is of a resilient viscoelastic rubber of a density of about 1.2 kg/m$^3$. When the syntactic foam sphere 12 is centered in the device, the distance between the sphere 12 and the inside surface 18 of the shield 16 is about two inches which is fully occupied by the viscoelastic rubber body 14.

The shield 16 protects the accelerometer 10 from impacts and provides a rigid structure for attachment to a mount 20.

The viscoelastic body 14 is acoustically transparent and isolates the accelerometer 10 and syntactic foam sphere 12 from the mount 20 and insulates the accelerometer 10 from structure-borne flexural vibrations from supporting structures near the sensor. The device can thus be mounted on shipboard structure with a minimum of self-noise and without loss of signal sensitivity because of nearby rigid structures.

Alternatively, the device can be floated at a level beneath the surface of a water body, inasmuch as the device is of neutral buoyancy.

The dimensions and specifications recited above apply to a sensor adapted to operate in water and to detect sound at frequencies of about 100 Hz to about 2000 Hz.

In operation, sound waves cause movement of elements of the accelerometer 10 in the syntactic foam 12, by which the accelerometer generates data indicating velocity of sound and direction from which the sound is propagated. From such data generated on a continuing basis, the course and speed of a target is determined.

There is thus provided an acoustic vector sensor with improved sensitivity in an environment of rigid structures, improved insulation from noise produced by such structures, and is further adapted to free float in a body of water.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. An acoustic vector sensor for monitoring acoustic energy underwater, the sensor comprising:
    an acoustic sensing tri-axial accelerometer;
    a body of syntactic foam encasing said accelerometer;
    a body of viscoelastic rubber encasing said body of syntactic foam; and
    a rigid plastics coating encasing said body of viscoelastic rubber.

2. The sensor in accordance with claim 1 wherein said foam body is of a spherical configuration and is of a density and a volume to provide neutral buoyancy to said sensor.

3. The sensor in accordance with claim 2 wherein said rubber body is substantially acoustically transparent and is of spherical configuration, and said foam body is disposed centrally of said rubber body.

4. The sensor in accordance with claim 3 wherein said sensing accelerometer is of a weight of about 0.6 ounce and said foam body is of a density of about 380 kg/m$^3$ and a volume of about 1.4 in$^3$.

5. The sensor in accordance with claim 4 wherein said foam body is provided with a diameter of about 1.6 inch and said rubber body comprises a layer around said foam body about 2.0 inches thick.

6. The sensor in accordance with claim 1 wherein said rigid coating is provided with a mounting portion for attachment to a support.

7. The sensor in accordance with claim 6 wherein said rubber body is adapted to filter out noise from the underwater support to which the sensor mounting portion is attached.

* * * * *